(12) United States Patent
Felstaine et al.

(10) Patent No.: US 11,775,984 B1
(45) Date of Patent: Oct. 3, 2023

(54) SYSTEM, METHOD, AND COMPUTER PROGRAM FOR PREEMPTING BILL RELATED WORKLOAD IN A CALL-CENTER

(71) Applicant: Amdocs Development Limited, Limassol (CY)

(72) Inventors: Eyal Felstaine, Herzliya (IL); Gad Yitzhak Weissman, Hod Hasharon (IL); Marina Ankri, Karnei Shomron (IL); Nimrod Sandlerman, Ramat Gan (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 347 days.

(21) Appl. No.: 17/121,559

(22) Filed: Dec. 14, 2020

(51) Int. Cl.
*G06Q 20/12* (2012.01)
*G06Q 30/016* (2023.01)
*G06Q 40/12* (2023.01)
*G06Q 10/10* (2023.01)
*G06Q 30/04* (2012.01)
*H04M 3/523* (2006.01)
*H04M 15/00* (2006.01)
*G06N 20/00* (2019.01)

(52) U.S. Cl.
CPC ........... *G06Q 30/016* (2013.01); *G06N 20/00* (2019.01); *G06Q 10/10* (2013.01); *G06Q 30/04* (2013.01); *G06Q 40/12* (2013.12); *H04M 3/523* (2013.01); *H04M 15/41* (2013.01); *H04M 15/67* (2013.01); *H04M 15/90* (2013.01); *G06Q 20/127* (2013.01)

(58) Field of Classification Search
CPC .... G06Q 20/102; G06Q 20/127; G06Q 20/14; G06Q 30/04; G06Q 30/06; G06Q 10/10; H04T 2001/215; H04M 3/523; H04M 15/41; H04M 15/67; H04M 15/90; G06N 20/00
USPC .......................................... 705/34
See application file for complete search history.

(56) References Cited

U.S. PATENT DOCUMENTS

| | | | |
|---|---|---|---|
| 7,080,051 B1 * | 7/2006 | Crawford | G06Q 40/12 717/172 |
| 9,998,596 B1 * | 6/2018 | Dunmire | H04M 3/5158 |
| 10,452,674 B2 * | 10/2019 | Diwan | G06F 3/167 |
| 10,469,665 B1 * | 11/2019 | Bell | H04L 67/535 |
| 10,860,701 B2 * | 12/2020 | Chatterton | G06V 40/23 |
| 10,861,454 B2 * | 12/2020 | Wang | G06F 3/167 |
| 10,887,098 B2 * | 1/2021 | Van Der Velden | G06K 7/1413 |

(Continued)

*Primary Examiner* — Andrew Joseph Rudy
(74) *Attorney, Agent, or Firm* — Zilka-Kotab, P.C.

(57) ABSTRACT

A system, method, and computer program are provided for processing a billing item. In use, a first dataset is collected including a plurality of records. The first dataset includes customer records, billing records (with billing item(s)) for each of the customers, and call incident records (with calling customer identification, billing record identification, and billing item identification). Additionally, a first AI-model is trained using the first dataset to recognize at least one pair of a first customer type and a first billing item type, and an associated first probability that such pair results in a call to the call-center. Further, a second dataset is collected including new billing records. The first AI-model is used to detect at least one billing record in the second dataset having probability higher than a redefined threshold probability that the customer associated with the billing record will call a call-center.

16 Claims, 8 Drawing Sheets

(56) References Cited

U.S. PATENT DOCUMENTS

| | | | |
|---|---|---|---|
| 11,363,141 B2* | 6/2022 | Friio | G10L 15/26 |
| 11,416,896 B2* | 8/2022 | Briancon | G06F 18/24 |
| 11,458,404 B2* | 10/2022 | Rudi | A63F 13/79 |
| 11,514,414 B2* | 11/2022 | Benkreira | G06Q 20/405 |
| 2020/0074476 A1* | 3/2020 | Ellison | G06N 3/088 |
| 2021/0326960 A1* | 10/2021 | Nosrati | G06N 3/04 |
| 2021/0360006 A1* | 11/2021 | Kim | G06N 3/08 |

* cited by examiner

SYSTEM, METHOD, AND COMPUTER PROGRAM FOR PREEMPTING BILL RELATED WORKLOAD IN A CALL-CENTER

FIELD OF THE INVENTION

The present invention relates to the field of business support systems, and, more particularly, but not exclusively to processing billing content to reduce call-center workload.

BACKGROUND

Large scale service providers such as companies operating a communication network providing various services to a very large number of customers operate large and very costly call-centers to resolve customers' complaints. Such service providers have a motivation to reduce the call-center cost by anticipating, and possibly eliminating, the reason for which a customer may call the call-center, and more important, increasing customer satisfaction. A large percent of customers' calls to the call-center involve the periodical bill the customer may have received. There is thus a need for addressing these and/or other issues associated with the prior art.

SUMMARY

As described herein, a system, method, and computer program are provided for processing a billing item. In use, a first dataset is collected including a plurality of records. In particular, the first dataset includes a plurality of customer records, a plurality of billing records for each of the customers, and a plurality of call incident records. Each billing record includes at least one billing item. Each call incident record includes an identification of the calling customer, an identification of a billing record, and an identification of a billing item discussed with the calling customer during a past call with a call-center. Additionally, a first AI-model is trained using the first dataset to recognize at least one pair of a first customer type and a first billing item type, and an associated first probability that such pair results in a call to the call-center. Further, a second dataset is collected including new billing records. The first AI-model is used to detect at least one billing record in the second dataset having probability higher than a predefined threshold probability that the customer associated with the billing record will call the call-center.

DETAILED DESCRIPTION

Figure 1:
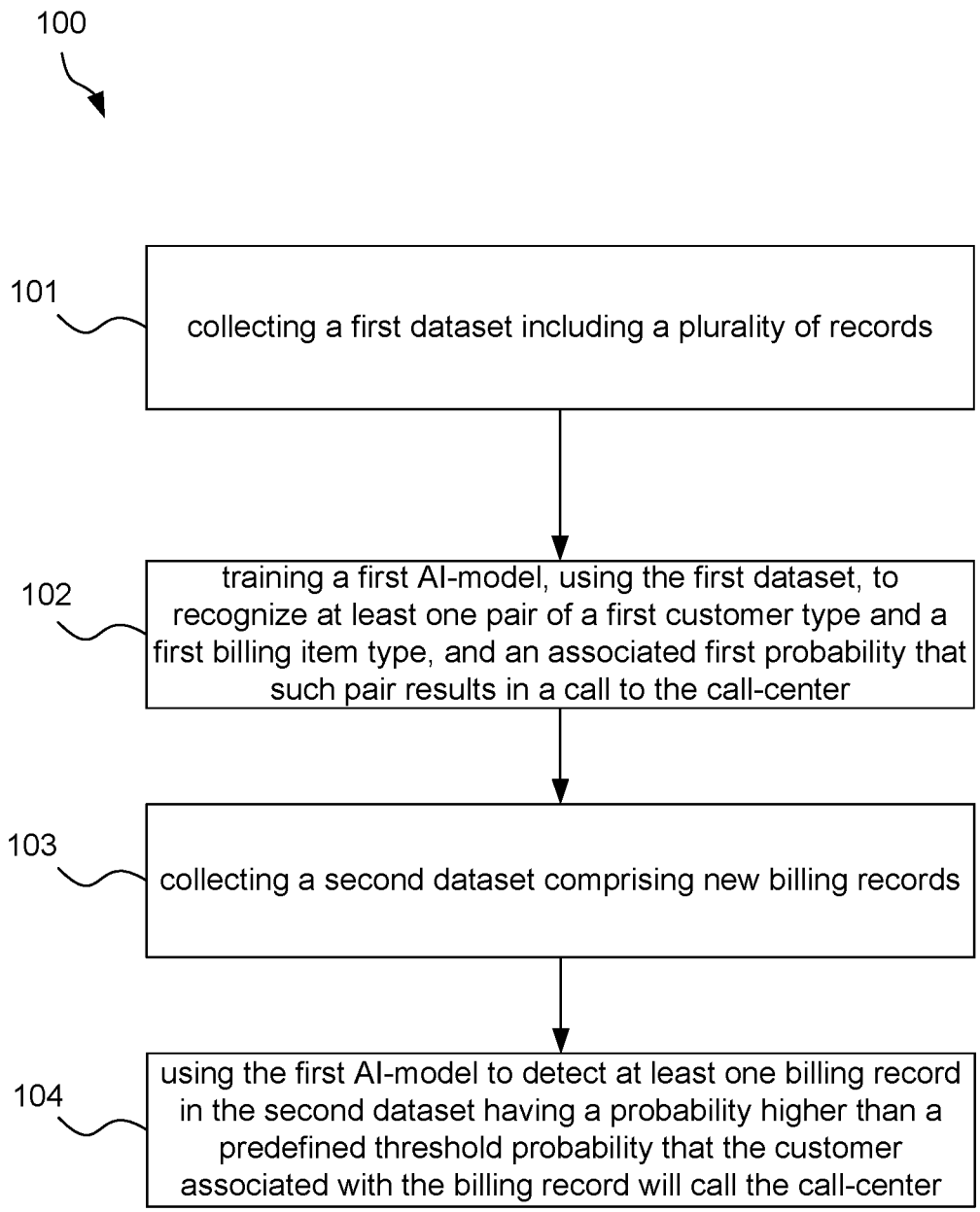
FIG. 1 illustrates a method for processing a billing item, in accordance with one embodiment.

FIG. 1 illustrates a method 100 for processing a billing item, in accordance with one embodiment. The method 100 may be performed by any computer system, such as the computer systems described below with reference to FIGS. 2 and/or 3. For example, the method 100 may be performed by a server of an operator having a call-center. It should be noted that definitions of any of the terminology described with respect to the present embodiment may be provided in the subsequent descriptions below.

In operation 101, a first dataset is collected including a plurality of records. In particular, the first dataset includes a plurality of customer records, a plurality of billing records for each of the customers, and a plurality of call incident records. Each billing record includes at least one billing item. Each call incident record includes an identification of the calling customer, an identification of a billing record, and an identification of a billing item discussed with the calling customer during a past call with the call-center. As a further option, each record of the first dataset may additionally include at least one of: date of the past call to the call-center, time of the past call to the call-center, a billing item not discussed during the past call to the call-center, or an estimation of a cost of the past call to the call-center.

Additionally, in operation 102, a first AI-model is trained using the first dataset to recognize at least one pair of a first customer type and a first billing item type, and an associated first probability that such pair results in a call to the call-center. Further, in operation 103, a second dataset is collected including new billing records. As an option, each record of the second dataset may include at least one of: date of discussion with the customer, time of discussion with the customer, billing data not discussed with the customer, compensation refused by the customer, or an estimation of the cost of the compensation accepted by the customer. In operation 104, the first AI-model is used to detect at least one billing record in the second dataset having probability higher than a predefined threshold probability that the customer associated with the billing record will call the call-center.

As another option following operation 104, at least two of the following may be indicated to a user, the billing record having the probability higher than the predefined threshold, the customer associated with the billing record having the probability higher than the predefined threshold, and the billing item type having a highest probability to be discussed by the customer in the call to the call-center.

As a further option following, at least in part, operation 104, a third dataset may be collected, which includes customer identification, a billing item discussed with a customer, and a resolution accepted by the customer to resolve a problem associated with the billing item. Then, a second AI-model may be trained using the third dataset to recognize at least one triplet of a second customer type, a second billing item type, and a resolution type, and an associated second probability that the resolution is accepted by the customer. For the at least one billing record detected in operation 104, the second AI model may be used to determine at least one resolution for the at least one billing item. As yet a further option, the steps of using the first AI model and using the second AI model may be iterated until each billing item type of the first dataset has a corresponding billing item type of the third dataset. As still yet another option, a preferred resolution may be selected from the at least one resolution. The selection may be made by calculating a selection criterion that includes at least one of: a probability that the customer may concede, a concession expectancy including the concede probability multiplied by an inverse of an estimation cost of the resolution, or a ratio between an estimation of the cost of handing the customer call and the estimation of cost of the resolution. The resolution may then be performed to preempt the call to the call-center.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In one embodiment, the purpose of the system and methods described below is to continuously and automatically analyze billing content to be issued to a particular customer, to determine a potential problem associated with a billing item of the particular bill, to determine a possible solution to the particular potential problem associated with a billing item, and to implement the possible solution before the bill is issued to the customer. This process may thus eliminate the need for the particular customer to call the call-center, reducing the call-center workload, and reducing the call-center operating cost, and even more important, increasing customer satisfaction.

The term 'operator' may refer to an operator of a communication network (also known as 'carrier'). However, the term operator may also refer to any provider of service to the public, and/or any other business entity that issue bills to customers for an ongoing service, and expect customers to contact the business to resolve problems or questions related to a bill.

The term 'communication network' or 'network' may refer to any type of electronic network for communicating data between any type of data servers, network servers, network nodes, and any type of terminal equipment. The term 'communication network' or 'network' may refer to networks such as wired telephony service (POTS, PSTN), wireless (mobile, cellular) telephony service (PLMN), satellite communication service (e.g., SATCOM), multi-channel television service via cable, satellite, wireless terrestrial transmission, and/or Internet, multichannel video programming distributor (MVPD), virtual MVPD (vMVPD), Internet service (e.g., via an Internet service provider—ISP or via an wireless Internet service provider—WISP), etc. The term 'communication network' or 'network' may refer to any combination of the above.

The term 'service' may refer to any type of communication service provided to a customer, such as a customer of an operator of a communication network, as well as access to content including transmission, reception, and exchange of content. However, the term 'service' may refer to any type of communication service provided to a customer, such as a subscriber, and particularly an ongoing service that is likely to generate periodical bills.

The term 'content' may refer to any type of text, image, video, three-dimensional (3D) imaging, games (e.g., computer games and/or video games), virtual reality content, augmented reality content, etc.

An operator may provide services to a plurality of customers, where each customer may use a particular plurality (e.g., combination, configuration) of services. The customer and each of the services can be monetized in a plurality of monetization schemes, or a combination of monetization schemes. Each service may be associated with a cost, or a combination of costs, where a particular type of cost may also depend on the usage, as well as temporal distribution of usage, of other services. Additionally, a particular type of cost may also depend on the usage, as well as temporal distribution of usage, of other customers. Therefore, for each particular customer there may be a plurality of different business arrangement (configurations) that may have different respective business results.

The term 'monetizing' may refer to any type of billing or charging or applying revenues (as well as costs, expenditures, etc.) to any particular customer. For example, monetizing may refer to billing periodical (e.g., monthly, annual, etc.), billing by item consumed (e.g., a content item), billing by service consumed (e.g., bandwidth), etc.

The term 'monetizing' may also refer to any type of revenues received from a third party on behalf of the customer. For example, applying revenues from a third party's advertisement to the customer exposed to the advertisement. For example, applying marketing expenditure, such as advertisement and/or promotion by the operator to a customer. For example, applying monetary value for making use of the customer's social activity for promoting the operator or any type of operator's service.

Monetizing may take the form of actual revenues, or cost saving, or credit points. Such credit points may be issued, or charged to, the operator or any third party using a service of the operator.

The term 'bill' or 'billing' may refer to the act of issuing a document to the customer, the document indicating a charge to the customer for the services rendered to the customer by the operator in a previous period of time. The bill may include any number of billing items, each associated with the customer and at least one of the services rendered to the customer, as well as the monetization scheme applied to the particular customer (also known as 'plan', or 'bundle', or 'package', etc.).

The term 'temporal use', particularly with reference to monetizing, may refer to pricing a service according to time-of-day, day-of week, load type and/or load period, etc. The availability of services, particularly service provided by thirds parties, may frequently change. The pricing of any such service may also change, depending on general consumption, local consumption, competition, etc. Therefore, the plurality of business arrangements, as well as their business results to the operator, may change continuously and fast.

The term 'cost' or 'costing' may refer to any type of expenditure incurred by the operator and directly or indirectly associated with a service rendered to a customer. A service provider may provide to each particular customer a plurality of possible services. Each such service may be associated with a direct cost, where the cost of each service may depend on other services provided to the particular customer, as well as one or more services provided to other customers associated with the particular customer. Such association of costs, or cost sharing, may be determined according to the network topology and/or configuration.

Particularly, the term 'cost' may apply to the cost of operating a call-center. Particularly, the term 'cost' may apply to the cost of operating a call-center to deal with a customer call, such as to resolve a problem raised by the customer, particularly a problem associated with a particular billing item.

Further, the term 'cost' may also refer to the cost of customer churn, cost of customer switching, cost of customer retention, etc. Cost associated with a particular customer may also be determined in terms of customer lifetime value, gained, increased, or lost. Hence, an optional resolution to a particular potential call incident associated with a particular billing item may be considered in terms of the cost of the resolution, where the particular cost may be associated with the particular customer.

The term 'call-center' may refer to any technical means and/or manpower or organization of an operator or a similar business entity that communicates with customers of the operator or a similar business entity. A call-center may receive telephone calls from customers, or initiate telephone calls to customers, or communicate with customers in any other means of communication, such as text, video, bot, chat, instant messaging, social networks, etc.

The terms 'continuously' and 'automatically' may refer to the computing system operating the communication network, or a part thereof, that may, from time to time, determine automatically when to apply to a customer, and what to suggest to the customer, based on a large plurality of 'rules' and at least one parameter provided by the operator (e.g., operator's personnel).

The terms 'artificial intelligence or 'AI' may refer to any type and use of an software program, which may be called 'AI engine', to process a large amount of content or data, which may be called 'a dataset', to produce an 'AI-model', that can identify, and/or detect, and/or determine, and/or recognize, a particular type of content item, or data item, of the dataset, or a similar dataset. Typically the AI engine may produce an AI model that can identify a large number of content item types, or data item types. The term 'AI-model' may also be known as a 'predictor'. A 'training AI engine' may use a first dataset to train a particular algorithm to produce a respective AI-model. An 'inference AI engine' may use the AI-model to analyze a second dataset to detect particular data types, or to predict particular situations, etc.

Figure 2:
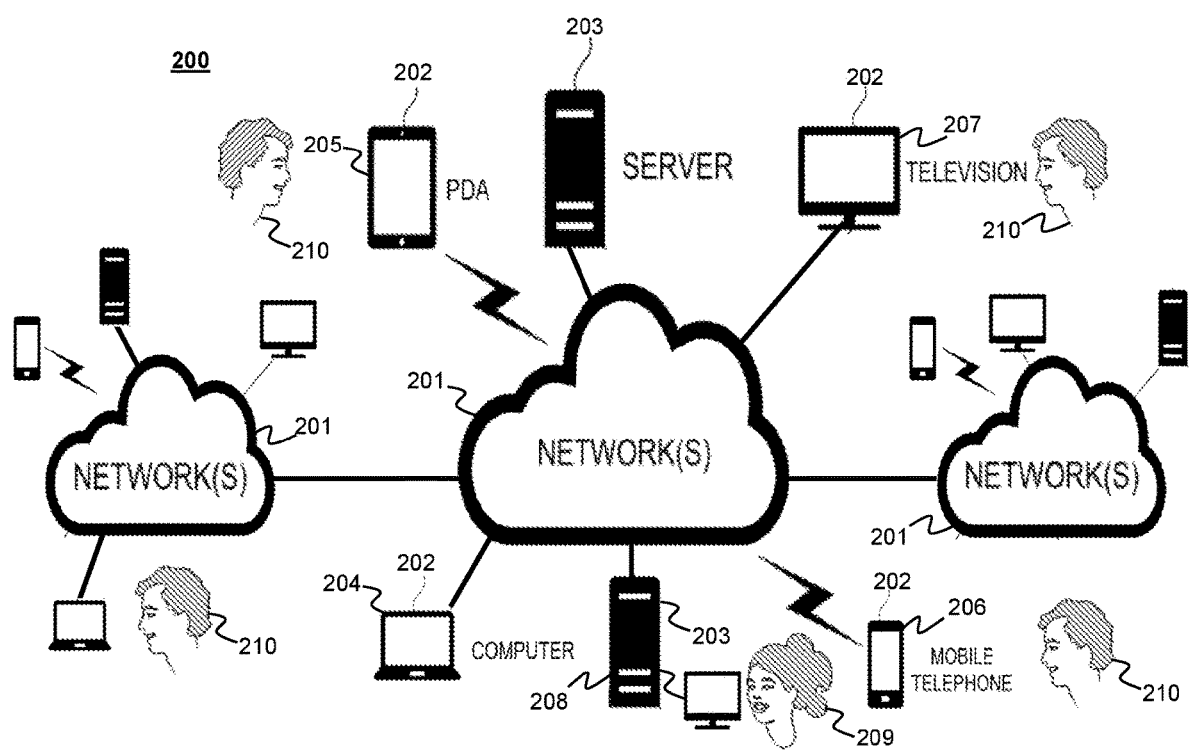
FIG. 2 illustrates a communication network and network architecture, in accordance with one embodiment.

FIG. 2 illustrates a communication network, in accordance with one embodiment. As an option, the flow diagram may be implemented in the context of the details of the previous figure and/or any subsequent figure(s). Of course, however, the flow diagram may be implemented in the context of any desired environment. Further, the aforementioned definitions may equally apply to the description below.

FIG. 2 illustrates a network architecture 200, in accordance with one possible embodiment. As shown, at least one network 201 is provided. In the context of the present network architecture 200, the network 201 may take any form including, but not limited to a telecommunications network, a local area network (LAN), a wireless network, a wide area network (WAN) such as the Internet, peer-to-peer network, cable network, etc. As shown, it should be understood that two or more similar or different networks 201 may be provided.

Coupled to the network 201 is a plurality of devices, such as terminals 202 and servers 203. For example, a server computer 203 and an end user computer 204 may be coupled to the network 201 for communication purposes. Such end user computer 204 may include a desktop computer, lap-top computer, and/or any other type of logic. Still yet, various other devices may be coupled to the network 201 including a personal digital assistant (PDA) device 205, a mobile phone device 206, a television 207, etc. Further, network 201 may be managed by a network management system 208, typically operating on, or executed by, one or more servers 203.

FIG. 2 also illustrates a user 209 and one or more customers 210. User 209 may typically be an administrator of network management system 208. Customer 210 may use any one or more of terminals 2011.

FIG. 1 illustrates an exemplary system 300, in accordance with one embodiment. As an option, the system 300 may be implemented in the context of any of the devices and/or servers of the network architecture 200 of FIG. 2. Of course, the system 300 may be implemented in any desired environment.

As shown, a system 300 is provided including at least one central processor 301 which is connected to a communication bus 302. The system 300 also includes main memory 303 [e.g. random access memory (RAM), etc.]. The system 300 also includes a graphics processor 304 and a display 305.

The system 300 may also include a secondary storage 306. The secondary storage 306 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 303, the secondary storage 306, and/or any other memory, for that matter. Such computer programs, when executed, enable the system 300 to perform various functions (as set forth above, for example). Memory 303, storage 306 and/or any other storage are possible examples of non-transitory computer-readable media.

The system 300 may also include one or more communication modules 307. The communication module 307 may be operable to facilitate communication between the system 300 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

Figure 4:
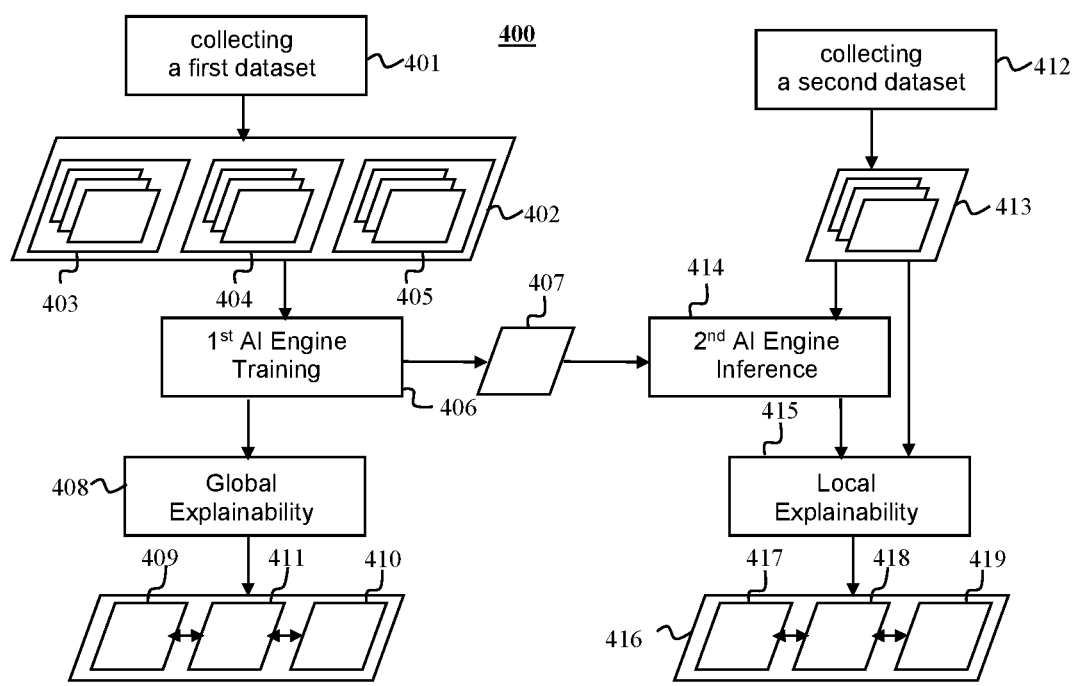
FIG. 4 illustrates a flow chart of a method for determining a billing record to be discussed in a call to a call center, in accordance with one embodiment.

FIG. 4 illustrates a flow chart of a method for determining a billing record to be discussed in a call to a call center, in accordance with one embodiment. The method may be implemented as a computational process 400. The computational process may have the form depicted in a flow-chart presented in FIG. 4.

Figure 3:
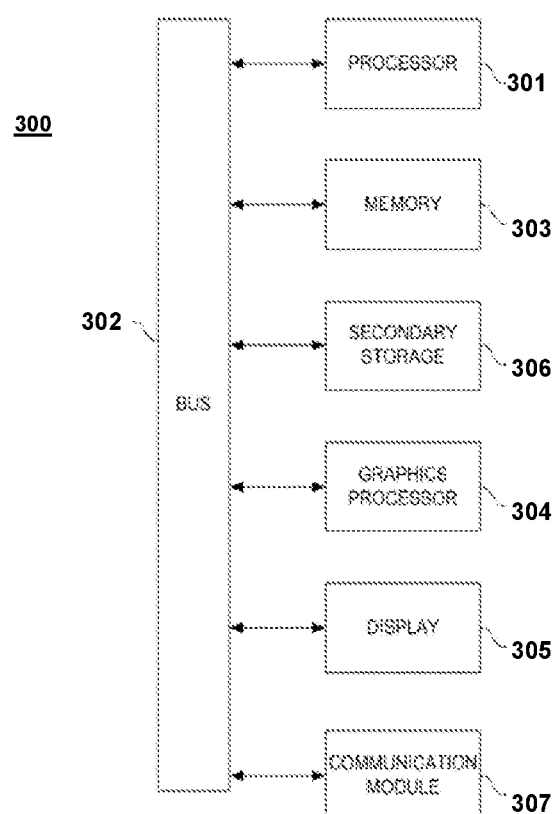
FIG. 3 illustrates an exemplary system in accordance with one embodiment.

As an option, FIG. 4 and/or process 400 may be implemented in the context of any of the devices and/or servers of the network architecture 200 of FIG. 2 and/or the system 300 of FIG. 3. Of course, the system 4 and/or process 400 may be implemented in any desired environment.

Process 400 may start in action 401, where process 400 may collect a first dataset 402. Dataset 402 may include of at least one plurality of instances. Instances of each plurality of instances may include the same set of parameters, that may be referred to a features of the type of instance.

Dataset 402 may be produced, for example, by a call-center. In such case dataset 402 may include a plurality of customer records 403, a plurality of billing records 404, and a plurality of call-center incident records 405 (call incident records). Instances of each of these plurality of records may include records having the same set of features.

Each customer record 403 may include a customer identification, and one or more customer parameters (e.g., features). Each billing record 404 may include an identification of the billing record, an identification of the customer for which the bill applies, a billing period, and at least one billing item. A billing item may include an identification of a particular service provided to the customer during the billing period, and the charge applied.

Each call incident record 405 may include an identification of the call incident, a time stamp, an identification of the calling customer, an identification of one or more billing records discussed during the call incident, and an identification of one or more respective billing items discussed during the call incident. A call incident record 405 may also include an identification of a type or class of characterizing a result of the call incident.

Process 400 may then proceed to action 406 to process dataset 402 by a first artificial Intelligence (AI) engine to produce an AI-model 407. AI-model 407 is typically produced by training AI engine 406 with the first dataset 402, which may be produced by a call-center.

The present embodiment may assume a given population of 'instances', having a particular distribution, such as, for example, a Gaussian or an exponential distribution. This may apply to any or all of the pluralities of dataset 402, such as customer records 403, billing record 404, and incident records 405.

The present embodiment may assume that the AI system, such as training AI engine 406, may perform unsupervised classification (clustering) of any given population. Thus, the present embodiment may assume that the distribution may be divided into a mainstream part and a tail part. Typically, mainstream part may include relatively few classes where each class may include a relatively larger number of instances, and a tail part may include relatively many classes where each class may include a relatively smaller number of instances.

The present embodiment may thus assume that the AI system may successfully cluster classes of the mainstream part and may fail to cluster classes of the tail part. It is appreciated that any method of clustering, or unsupervised training, is contemplated, as well as methods of supervised training.

Process 400 may then proceed to action 408 to process global explainability of the AI-model 407. Action 406 together with action 408 may produce customer classifications (types) 409, and billing item classifications (types) 410, as well as a probability matrix 411. Each cell of the probability matrix 411 may represent the probability that a particular pair of customer type (class) 409 and billing item type (class) 410 may result in the customer calling the call-center to discuss the particular billing item.

Process 400 may then proceed to action 412 to collect a second dataset 413 including new billing records to 403 be issued to customers. Instances of dataset 413 may include the same set of features as billing records 404 of dataset 402. Consequently, each of the billing records of dataset 413 may refer to a customer record of 403 of dataset 402.

Process 400 may then proceed to action 414 to process the second dataset 413 using the AI-model 407. Action 414 may be a second AI engine, typically an inference machine.

Process 400 may then proceed to action 415 to process local explainability on the output of action 414, so as to provide a report including a plurality of records 416, where each record may indicate a billing record 417 having probability higher than the predefined threshold to cause a customer to call the call-center, an identification of the customer 418 associated with the billing record having probability higher than the predefined threshold, and the billing item type 419 having highest probability to be discussed by the customer in the anticipated call to the call-center.

Figure 5:
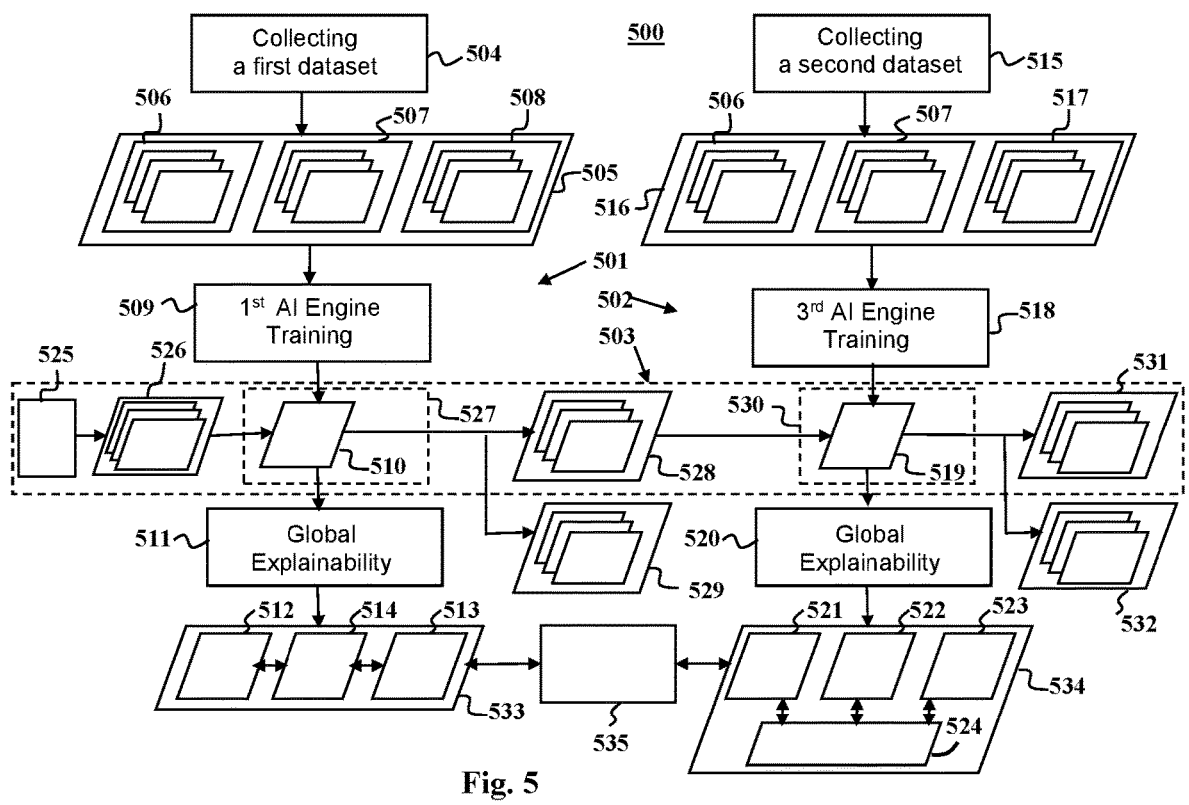
FIG. 5 illustrates a flow chart of an alternative method and system for determining a billing record to be discussed in a call to a call center, in accordance with one embodiment.

FIG. 5 illustrates a flow chart of a second method and system 500 for determining a billing record to be discussed in a call to a call center, in accordance with one embodiment.

As an option, the method and system 500 may be implemented in the context of any of the devices and/or servers of any of the devices and/or servers of the network architecture 200 of FIG. 2 and/or the system 300 of FIG. 3, or any of the previous Figures. Of course, the method and system 500 may be implemented in any desired environment.

Method and system 500 may include three parts, or processes, a first process 501a second process 502, and a third process 503, where process 501 may be substantially similar to process 400 as shown and described with reference to FIG. 4.

Process 501 may start in action 504 by collecting a first dataset 505 that may include a plurality of customer records 506, a plurality of billing records 507, and a plurality of call-center incident records 508 (call incident records).

As in dataset 402, dataset 505 may include at least one plurality of instances. Particularly, dataset 505 may include three such pluralities. Instances of each plurality of instances may include the same set of parameters, that may be referred to a features of the type of instance. A plurality of dataset 505 may include a mainstream part and a tail part as described above with reference to dataset 402.

Each customer record 506 may include a customer identification, and one or more customer parameters. Each billing record 507 may include an identification of the billing record, an identification of the customer for which the bill applies, a billing period, and at least one billing item. A billing item may include an identification of a particular service provided to the customer during the billing period, and the charge applied.

Each call incident record 508 may include an identification of the call incident, a time stamp, an identification of the calling customer, an identification of one or more billing records discussed during the call incident, and an identification of one or more respective billing items discussed during the call incident. A call incident record 405 may also include an identification of a type or class of characterizing a result of the call incident.

For example, each of these parameters indicated for each of the record types cited above may be referred to as a feature, and, for example, each of the records (instances) of the same plurality of records (instances), may have the same set of features.

Process 501 may then proceed to action 509 to process dataset 505 by a first AI engine to produce an AI-model 510. In this respect action 509 may be viewed as an AI engine being trained using dataset 505 to produce AI-model 510.

It is appreciated that AI engine 509 may perform unsupervised clustering of any of the above mentioned populations, that any of the above mentioned populations may have a distribution that may be divided into a mainstream part and a tail part as described above, and that AI engine 509 may successfully cluster classes of the mainstream part and may fail to cluster classes of the tail part. It is appreciated that any method of clustering, or unsupervised training, is contemplated, as well as methods of supervised training.

Process 501 may then proceed to action 511 to process global explainability of the AI-model 510. Action 509 together with action 511 may produce customer classifications (types) 512, and billing classifications (types) and/or billing item classifications (types) 513, as well as a probability matrix 514. Each cell of the probability matrix 514 may represent the probability that a particular pair of customer type (class) 512 and billing item type (class) 513 may result in the customer calling the call-center to discuss the particular billing item.

Process 502, optionally in parallel to process 501, may start in action 515, by collecting a second dataset 516, for example from the call center producing the first dataset 504. Dataset 516 may include a plurality of customer records 506, a plurality of billing records 507, and a plurality of call-center incident records 517 (call incident records) indicating that the discussion with the customer has reached a resolution.

Process 502 may than proceed to action 518 to process dataset 516 by a third AI engine to produce a second AI-model 519. Action 518 may be viewed as an AI engine being trained using dataset 516 to produce AI-model 519.

It is appreciated that the description of dataset 505 and AI engine 509 above with respect to the division of the respective distributions into mainstream part and a tail part, as well as the clustering and classification of the respective distributions, may also apply to dataset 516 and AI engine 520.

Process 502 may than proceed to action 521 to process global explainability of the AI-model 519. Action 518 together with action 521 may produce a plurality of customer classifications (types) 522, plurality of billing classifications (types), and/or billing item classifications 523, and plurality of resolution classifications (types) 524, as well as a probability matrix 525. Each cell of the probability matrix 514 may represent the probability that a particular triplet of customer type (class) 522, billing type (class) 523, and resolution type 524 may result in a resolution to a problem raised by the customer.

Process 503 may be initiated after process 501 and process 502 have produced their respective AI model 510 and AI model 519. Process 503 may start with action 526 to collect a third data set including a plurality of new billing records 527, which may be produced, for example, by an external billing system (not shown in FIG. 5).

Process 503 may then proceed to action 528 to process the third dataset of billing records 527, to produce a fourth dataset 529 including a plurality of records, where each records identified a potential call incident. Namely, that there is a probability surpassing a predetermined probability threshold that a particular customer may call the call-center for an issue associated with the particular billing record. In this respect, action 528 may be viewed as an AI inference machine using AI-model 510 to process dataset 527 to determine potential call incidents provided as dataset 529.

Each record of the fourth dataset 529 may identify a billing record, and preferably also a billing item of the billing record, as well as the customer associated with the billing record, where their combination has a particular probability (greater than the probability threshold) to cause the respective customer to call the call-center.

Each record of the fourth dataset 529 may include a customer identification (or an identification of a customer record), a billing record identification (or an identification of a billing record), and a billing item identification (or an identification of a billing item record).

Action 528 may also produce a dataset 529 of billing records not identifying a problem that may result in the respective customer calling the call-center. Or, alternatively, or additionally, a dataset 5 of billing records for which the probability that the customer may call the call-center for any problem associated with the billing record is below the probability threshold. For example, dataset 5 may include all records of dataset 527 not included in dataset 529.

Process 503 may then proceed to action 530 to process the fourth dataset 529, using AI-model 519, to produce a fifth dataset 531 including a plurality of records, where each record identifies a potential resolution to the respective call incident of the respective record of the fourth dataset 529. Namely, that there is a probability surpassing a predetermined probability threshold that a particular resolution may cause the respective customer to avoid calling the call-center for the particular issue associated with the particular billing record. In this respect, action 530 may be viewed as an AI inference machine using AI-model 519 to process dataset 529 to determine potential resolutions to potential call incidents, the potential resolutions may be provided as dataset 531.

Each record of the fifth dataset 531 may include a customer identification (or an identification of a customer record), a billing record identification (or an identification of a billing record), a billing item identification (or an identification of a billing item record), and a resolution type, as well as the probability that the resolution is accepted by the respective customer.

Action 530 may also produce a dataset 532 of billing records not identifying a problem that may result in the respective customer calling the call-center. Or, alternatively, or additionally, a dataset 532 of billing records for which the probability that the customer may call the call-center for any problem associated with the billing record is below the probability threshold. For example, dataset 532 may include all records of dataset 529 not included in dataset 531.

It is appreciated that the fifth dataset 531 may be communicated to the (external) billing system to correct the billing records so as to avoid the anticipated customer's call to the call-center.

It is appreciated that process 503 may be a repetitive process, and/or continuous process, and that the entire method and system 500 may be a repetitive process, and/or continuous process.

It is appreciated that the classification 533 of process 501 may be different from the classification 534 of process 502. For example, the customer types (classes) 512 may be different from the customer types (classes) 522. For example, the billing item types (classes) 513 may be different from the billing item types (classes) 523.

It is appreciated that the fourth dataset 529 may include the classification of the respective customer, and/or billing record, and/or billing item, and that the AI-model 519 may consider these classifications. Hence there may be a motivation to associate the classes (types, labels) of classification 533 with the classes (types, labels) of classification 534. It is appreciated that a fourth process 535 may produce association between each of the classes of classification 533 and each of the classes of classification 534, optionally as a one-to-one (injective) relation.

For example, the classes of the customer classification 512 may be divided, and/or the classes of the customer classification 522 may be divided, or both can be divided, so that each customer class of customer classification 512 has a unique corresponding customer class of customer classification 522. Alternatively or additionally, the classes of the billing record and/or item classification 513 may be divided, and/or the classes of the billing record and/or item classification 523 may be divided, or both can be divided, so that each class of billing record and/or item 513 has a unique corresponding class of billing record and/or item classification 523.

If AI-model 510 is successful in determining billing records, and/or billing items that are likely to cause a call to the call-center, and if AI-model 519 is successful in determining a solution to the problem associated with the billing records and/or billing billing items as determined by AI-model 510, and if these causes for call incidents (customer call to the call-center) are resolved in the bill before it is sent to the customer, then these call incidents will disappear from the data produced by the call-center. The same applies to process 400 of FIG. 4.

In other words, method and system 500 may be executed repeatedly. Particularly, process 503 may process new third dataset of billing records 526, every time such dataset is produced by the billing system. If method and system 500 is successful in avoiding particular types of call incidents than these types of call incidents will not appear in later third dataset of billing records 526, and method and system 500 may have nothing to detect and/or resolve. In other words, the success of method and system 500 is bound to deteriorate the effectiveness of its AI-model 510 and/or AI-model 519. The same applies to process 400 of FIG. 4.

As time passes, the call-center may produce new and/or updated first dataset 505 and/or second dataset 516. Consequently method and system 500 may be repeated from time to time to process the new and/or updated first dataset 505 and/or second dataset 516. For example to train a new or/or updated AI-model 510 and/or AI-model 519, and/or to generate new respective classifications 533 and/or 534. However, if method and system 500 is successful than the causes relevant to the success will disappear from later datasets. Hence, later AI-model 510 and/or AI-model 519 will not be able to detect and/or resolve earlier causes. The term 'earlier causes' may refer to billing problems and/or respective call incidents that earlier AI-model 510 and/or AI-model 519 were able to detect and resolve. The same applies to process 400 of FIG. 4.

First dataset 505 and/or second dataset 516 may be cumulative or periodical. A cumulative dataset 505 and/or 516 may be accumulated over, or produced for, a long period of time to date. A periodical dataset 505 and/or 516 may be produced for a particular period.

Figure 6:
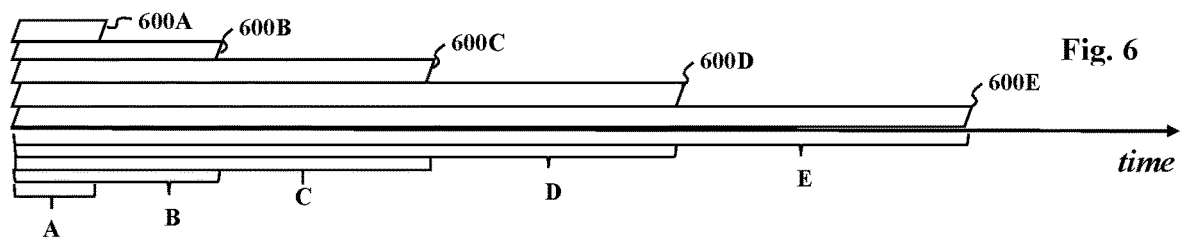
FIG. 6 illustrates a block diagram of a sequence of cumulative datasets, in accordance with one embodiment.
Figure 7:
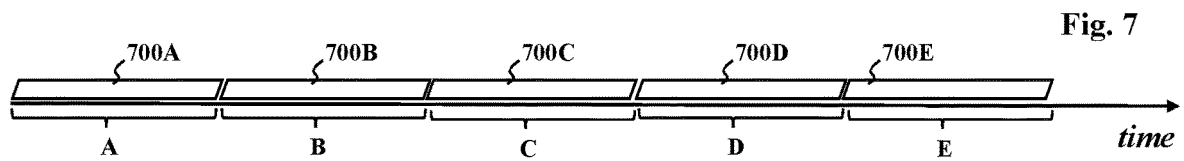
FIG. 7 illustrates a block diagram of a sequence of sequentially periodical datasets, in accordance with one embodiment.
Figure 8:
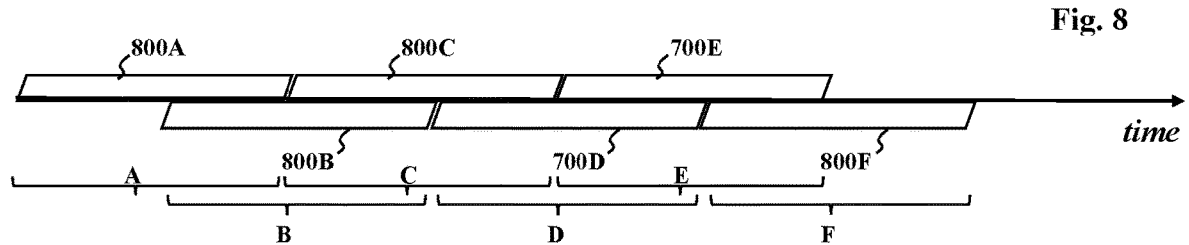
FIG. 8 illustrates a block diagram of a sequence of partially overlapping periodical datasets, in accordance with one embodiment.

FIG. 6 illustrates a block diagram of a sequence of cumulative datasets 600, in accordance with one embodiment. FIG. 7 illustrates a block diagram of a sequence of sequentially periodical datasets 700, in accordance with one embodiment. FIG. 8 illustrates a block diagram of a sequence of partially overlapping periodical datasets 800, in accordance with one embodiment.

As an option, the datasets 600, and/or 700 and/or 800 may be implemented in the context of any of the previous Figures. Of course, the method and system 500 may be implemented in any desired environment.

Any of the datasets 600, and/or 700 and/or 800 may represent any of the datasets 402 and/or 413 of FIG. 4, and/or any of the datasets 505 and/or 516 (as well as dataset 526) of FIG. 5. In other words, for example, dataset 600A represents a sampling A, for example, by actions 504 and/or 515, creating respective datasets 505A and/or 516A, for the same time period A.

Similarly, dataset 600B represents a sampling B (for example, by actions 504 and/or 515) of datasets 505 and/or 516 (as well as dataset 526) of FIG. 5, creating respective datasets 505B and/or 516B, for the same time period B.

Similarly, datasets 700A and 700B represent samplings A and B of datasets 505 and/or 516 (as well as dataset 526), and datasets 800A and 800B represent samplings A and B of datasets 505 and/or 516 (as well as dataset 526).

As shown in FIG. 6, datasets 600A, 600B, 600C, 600D, and 600E represent cumulative datasets accumulated over different respective time periods A, B, C, and E. As shown in FIG. 6, datasets 600A, 600B, 600C, 600D, and 600E may start in the same time and end in different times. As disclosed above, each of the datasets 600A, 600B, 600C, 600D, and 600E may represent a respective dataset 402, and/or a dataset 413. Similarly, each of the datasets 600A, 600B, 600C, 600D, and 600E may represent a respective dataset 505 and/or 516 (as well as dataset 526). The same applies to FIGS. 7 and 8.

On one hand, cumulative datasets 600 include all billing records and call incidents, including problems associated with billing items as well as respective resolutions. Therefore, datasets 600 include types call incidents, problems and resolutions that may disappear with time as a result of the success of the method and system 500 (or process 400). Therefore, a process such as method and system 500 for processing datasets 600 is simpler than processing datasets 700 and/or 800. It is appreciated that processing a dataset 600 involves operating all the actions of method and system 500.

On the other hand, the old and fading call incidents, problems and resolutions are slowly diluted within the later datasets, so that later generated AI-models may not be able to detect them. Further, old data that is not currently useful may be diluting new types of call incidents, problems, and resolutions so that later generated AI-models may not be able to detect the new call incidents, problems, and resolutions.

As shown in FIG. 7, datasets 700A, 700B, 700C, 700D, and 700E represent periodical datasets sampled sequentially over subsequent different time periods. As shown in FIG. 7, each of datasets 700A, 700B, 700C, 700D, and 700E may start after the previous sampling period has ended. Datasets 700A, 700B, 700C, 700D may have any length of sampling time.

As shown in FIG. 8, datasets 800A, 800B, 800C, 800D, 800E, and 800F represent periodical datasets sampled sequentially over partially overlapping different time periods. As shown in FIG. 8, each of datasets 800 may start before a previous sampling period has ended to have a partially overlapping period with at least one previous dataset 800. Datasets 800 may have any length of sampling time. This arrangement of overlapping sampling periods enables longer sampling periods, and hence a dataset including more data records, and yet a higher sampling frequency (e.g., more datasets) as compared with datasets 700 of FIG. 7.

It is appreciated that each of the pair of datasets 505 and 516 for the same sampling period, such as pair 505A and 516A of datasets 600A, the two datasets 505A and 516A may have mutually correlated types (classes), associated by action 535 of FIG. 5. This may apply to all pairs such as datasets 505B and 516B of datasets 700B, datasets 505C and 516C of datasets 800C, etc.

Figure 9:
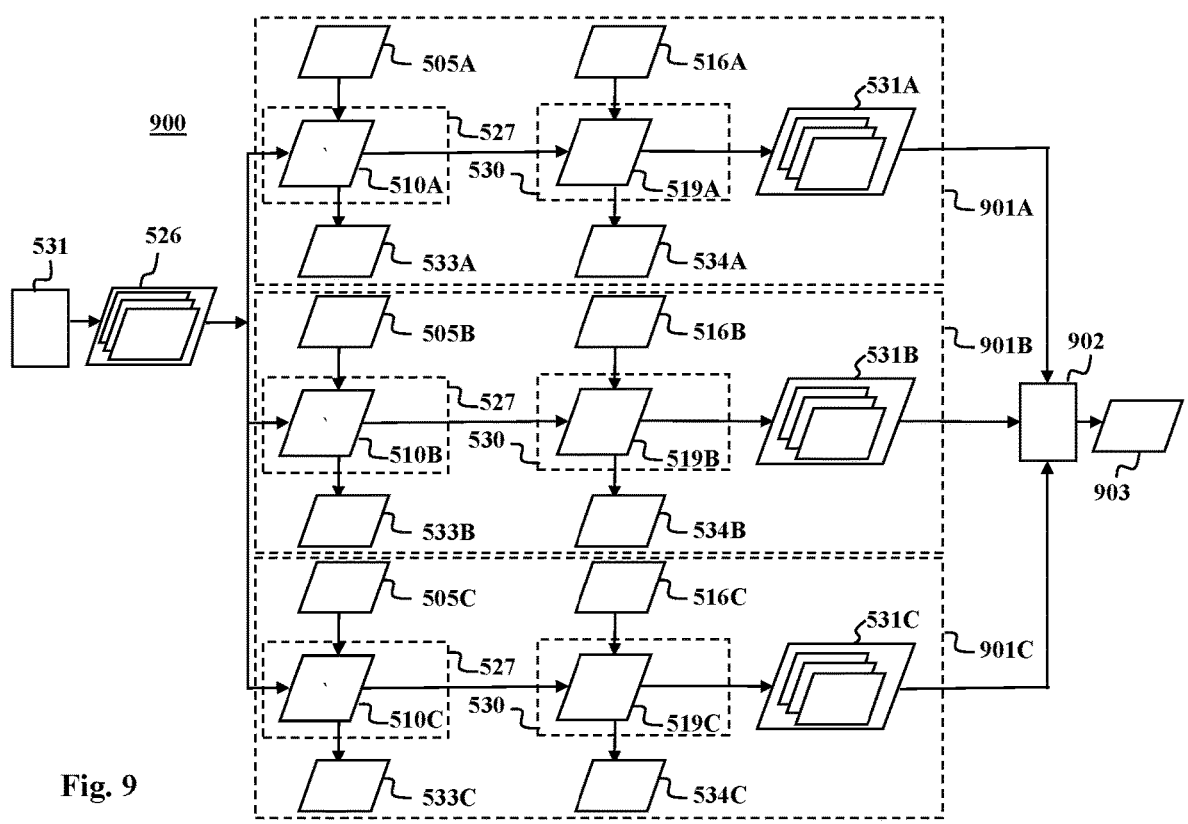
FIG. 9 illustrates a block diagram of method and system for parallel processing of cumulative datasets, in accordance with one embodiment.

FIG. 9 illustrates a block diagram of method and system 900 for parallel processing of datasets 700 and/or 800, in accordance with one embodiment. As an option, the method and system 900 may be implemented in the context of any of the previous Figures. Of course, the method and system 900 may be implemented in any desired environment.

As shown in FIG. 9, method and system 900 may have a plurality of sub-processes 901. Method and system 900 of FIG. 9 shows three sub-processes 901 enumerated 901A, 901B, and 901C. Each sub-process 901 represents a complete method and system 500, though only few elements of method and system 500 are shown in FIG. 9. It is appreciated that method and system 900 may have any number of processes 901.

As shown in FIG. 9, each of the sub-processes 901 may be trained with a different dataset 700 or 800, representing a sampling of datasets 505 and/or 516. For example, as shown in FIG. 9, sub-process 901A may be trained with dataset 700A, which is represented in FIG. 9 as datasets 505A and 516A.

Similarly, sub-process 901B may be trained with dataset 700B represented in FIG. 9 as datasets 505B and/or 516B. Similarly, sub-process 901C may be trained with dataset 700C represented in FIG. 9 as datasets 505B and/or 516B.

It is appreciated that method and system 900 may have any number of processes 901 processing a respective number of generations A, B, C, D, etc. of periodical datasets 700.

Alternatively, for example, sub-process 901A may be trained with dataset 800A represented in FIG. 9 as datasets 505A and 516A. Sub-process 901B may be trained with dataset 800B represented in FIG. 9 as datasets 505B and 516B. And sub-process 901C may be trained with dataset 800C represented in FIG. 9 as datasets 505C and/or 516C. It is appreciated that method and system 900 may have any number of processes 901 processing a respective number of generations A, B, C, D, etc. of periodical datasets 800.

Method and system 900 may therefore be trained with a plurality of dataset 700 or 800. Thereafter a new input dataset 526, collected from a billing system, may be provided to each of the subprocesses 901A, 901B, and 901C. Thereafter, each of sub-processes 901A, 901B, and 901C may produce a respective output 531A, 531B, and 531C.

It is appreciated that each of the pairs of datasets 505 and 516 for the same sampling period and sub-processes 901 may have mutually correlated types (classes), as associated by action 535 of FIG. 5. In this respect, datasets 505A and 516A of sub-processes 901A may have mutually correlated types (classes), associated by action 535 of FIG. 5. Similarly, datasets 505B and 516B of sub-processes 901B may be mutually correlated types, as well as datasets 505C and 516C of sub-processes 901C. Therefore, the types (classes) of each such pair of datasets 505 and 516 may be independently correlated.

Optionally and/or additionally, the outputs 531A, 531B, and 531C of processes 901A, 901B, and 901C may be provided to a comparator action 902. For example, an instance (record) of input dataset 526 may be recognized by two or more processes 901 producing two respective records 531. These two (or more) records 531 may be compared by comparator action 902 to select the best for example according to a predefined criterion. The selected records are then provided as the output 903 of method and system 900.

The criterion may be, for example, the resolution (solution) having the highest probability of being accepted by the respective customer. Other criteria are contemplated, for example, the combined probability of recognition by the respective pair of AI models 510 and 519.

Figure 10:
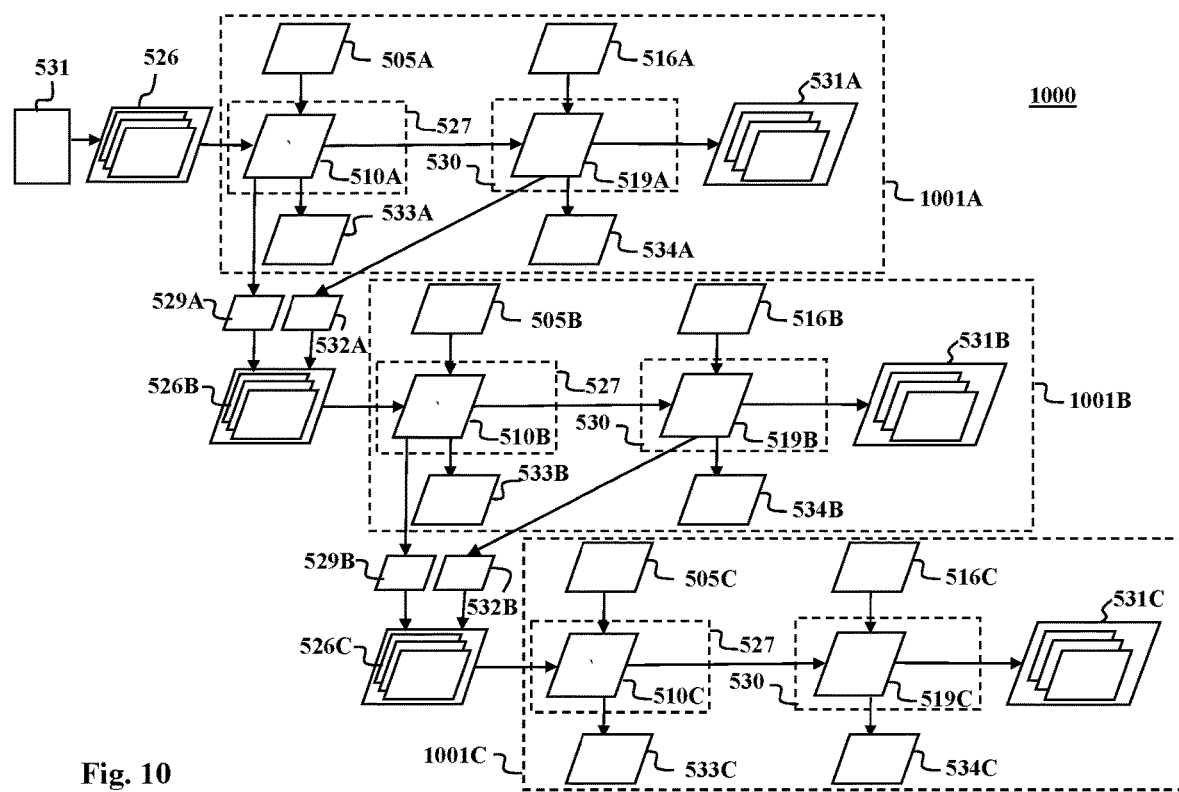
FIG. 10 illustrates a block diagram of method and system for sequential processing of periodical datasets, in accordance with one embodiment.

FIG. 10 illustrates a block diagram of method and system 1000 for sequential processing of datasets 700 and/or 800, in accordance with one embodiment. As an option, the method and system 1000 may be implemented in the context of any of the previous Figures. Of course, the method and system 1000 may be implemented in any desired environment.

As shown in FIG. 10, method and system 1000 may have a plurality of sub-processes 1001. Method and system 1000 of FIG. 10 shows three sub-processes 1001 enumerated 1001A, 1001B, and 1001C. Each sub-process 1001 represents a complete method and system 500, though only few elements of method and system 500 are shown in FIG. 10.

Each of the sub-processes 1001A, 1001B, and 1001C may be trained by a respective dataset 700A, 700B, 700C, or by a respective dataset 800A, 800B, 800C. Dataset 700A or 800A is represented in FIG. 10 by datasets 505A and 516A, dataset 700B or 800B is represented in FIG. 10 by datasets 505B and 516B, and dataset 700C or 800C is represented in FIG. 10 by datasets 505C and 516C.

The training by dataset 700A or 800A produces the respective AI-models 510A and 519A of 1001A. The training by dataset 700B or 800B produces the respective AI-models 510B and 519B of 1001B. The training by dataset 700C or 800C produces the respective AI-models 510C and 519C of 1001C.

Returning to FIG. 5, action 528, using AI model 510, may produce a dataset 529 including a plurality of records, where each record identifies a potential call incident. Namely, that there is a probability surpassing a predetermined probability threshold that a particular customer may call the call-center for an issue associated with the particular billing record. Dataset 529 (not shown in FIG. 10) may be provided to the input of action 530 to process the fourth dataset 529, using AI-model 519, to produce a fifth dataset 531.

Additionally, action 528 may also produce a dataset 529 of billing records not identifying a problem that may result in the respective customer calling the call-center. Or, alternatively, a dataset 5 of billing records for which the probability that the customer may call the call-center for any problem associated with the billing record is below the probability threshold.

Similarly, action 530, using AI model 519, may produce the fifth dataset 531 including a plurality of records, where each records identified a potential resolution to the respective call incident of the respective record of the fourth dataset 529. Namely, that there is a probability surpassing a predetermined probability threshold that a particular resolution may cause the respective customer to avoid calling the call-center for the particular issue associated with the particular billing record.

Additionally action 530 may also produce dataset 532 of billing records not identifying a problem that may result in the respective customer calling the call-center. Or, alternatively, dataset 532 may include billing records for which the probability that the customer may call the call-center for any problem associated with the billing record is below the probability threshold.

As shown in FIG. 10, dataset 5A, and dataset 532A, produced by sub-process 1001A, may be combined as dataset 526B to be provided to the input of sub-process 1001B. Similarly, dataset 5B, and dataset 532B, produced by sub-process 1001B, may be combined as dataset 526C to be provided to the input of sub-process 1001C, and so on.

It is appreciated that preferably the first sub-process to process that current dataset 526, namely sub-process 1001A, may be trained with the latest dataset of the 700 and/or 800 datasets, namely dataset 700E, or dataset 800F. In other words, datasets 505A and 516A may be derived from dataset 700E, or dataset 800F. The following sub-process 1001B, may be trained with the next latest (penultimate) dataset of the 700 and/or 800 datasets, namely dataset 700D, or dataset 800E. In other words, datasets 505B and 516B may be derived from dataset 700D, or dataset 800E. Consequently, sub-process 1001C, may be trained with the previously sampled dataset of the 700 and/or 800 datasets, namely dataset 700C, or dataset 800D. In other words, datasets 505C and 516C may be derived from dataset 700C, or dataset 800D. In this way only those records that are not determined for cause and/or resolution according to the most current datasets produced by the call-center, are then processed according to datasets produced by the call-center earlier.

It is appreciated that each of the pairs of datasets 505 and 516 for the same sampling period and sub-processes 1001 may have mutually correlated types (classes), as associated by action 535 of FIG. 5. In this respect, datasets 505A and 516A of sub-processes 1001A may have mutually correlated types (classes), associated by action 535 of FIG. 5. Similarly, datasets 505B and 516B of sub-processes 1001B may be mutually correlated types, as well as datasets 505C and 516C of sub-processes 1001C. Therefore, the types (classes) of each such pair of datasets 505 and 516 may be independently correlated.

It is appreciated that the use of any of process 400 of FIG. 4 and/or method and system 500 of FIG. 5, and/or method and system 900 of FIG. 9, and/or method and system 1000 of FIG. 10, may reduce the cost of operating a call center by detecting, in a bill to be issued to a customer, a potential cause for the customer to call the call center, by determining a potential resolution for the cause to call the call center, and thereafter by amending the bill before it is issued to the customer. Therefore the call incident is avoided and the cost of operating the call center is removed.

The general process of reducing the cost of operating the call center may start by collecting a first dataset including customer calls to a call-center where each call is related to a particular bill. The dataset includes date and time of the call, customer identification of the customer calling the call-center, complete billing data, the billing item discussed in the call and optionally also billing data not discussed in the call, the result of the call, and cost estimation of the call.

A first AI-model is then trained to characterize and detect pairs of a customer type and a billing item type that have high probability to result in a call to the call center. There are two steps here: the first step involves characterizing the types (customer and bill), and the second step involves the AI model to determine if the particular bill is likely to result in a call to the call center.

A second dataset is collected including actions taken to resolve problems associated with billing items. The dataset includes date and time of the call, customer identification of the customer calling the call-center, complete billing data, the item discussed in the call and optionally also billing data not discussed in the call, the compensation offered to the customer, the compensation accepted by the customer and cost estimation of the compensation accepted by the customer.

A second AI-model is then trained to characterize and detect triplets of a customer type, a billing item type, and the resolution/offer/compensation that have high probability to be accepted by the customer. There are two steps here: the first step involves characterizing the types (customer, billing item, and compensation), and the second step involves the AI model to determine if the customer-billing-item has a candidate compensation.

The actions of training the first and the second AI-models are iterated until each billing item of billing item types of the first dataset is associated with a billing item of billing item types of the second dataset. Namely, both AI-models can detect respective pairs/triplets for each, and any billing item types. The customer classification/characteristics may be different for the two datasets/AI-models.

Thereafter, the first AI model is used to scan customer bills before they are sent to customers to detect customer-billing-item pairs that surpass a predefined load threshold. The load threshold may be the probability the customer may call the call-center, or the cost expectancy (probability multiplied by the cost of handing the customer call), or the ratio between the cost of handing the customer call and the value of the billing item, etc.

Thereafter, for the customer-billing-item pairs that surpass the predefined load threshold, the second AI model is used to determine possible resolutions (triplets) for each customer-billing-item pair, and to select a preferred resolution, for example, by calculating a selection criterion such as the probability that the customer may concede, or the concession expectancy, or the ratio between the cost of handing the customer call and the cost of the offer, etc.

The concession expectancy may represent, for example, a combination of probability and cost of resolution. Therefore, for example, the preferred resolution may have a combination of relatively high probability and relatively low cost of resolution. Concession expectancy may be calculated, for example, as concede probability multiplied by the inverse of the cost of the offer. In this respect, the inverse of the cost of the offer may be represented, for example, as the value "1" divided by the value of the cost of the offer. Other formulas are also contemplated.

The process described above may be executed in parallel as shown and described above with reference to FIG. 9, for different, temporally dispersed, datasets such as shown and described above with reference to FIG. 6, and/or FIG. 7, and/or FIG. 8.

Alternatively, the process described above may be executed in a pipeline mode as shown and described above with reference to FIG. 10, for different, temporally dispersed, datasets such as shown and described above with reference to FIG. 7, and/or FIG. 8.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a billing item, the method comprising:
   collecting a first dataset including a plurality of records, wherein the first dataset includes:
      a plurality of customer records,
      a plurality of billing records for each of the customers, wherein each billing record includes at least one billing item, and
      a plurality of call incident records, wherein each call incident record includes:
         an identification of the calling customer,
         an identification of a billing record, and
         an identification of a billing item discussed with the calling customer during a past call with a call-center;
   training a first artificial intelligence model (AI-model), using the first dataset, to recognize at least one pair of a first customer type and a first billing item type, and an associated first probability that such pair results in a call to the call-center;
   collecting a second dataset comprising new billing records;
   using the first AI-model to detect at least one billing record in the second dataset having a probability higher than a predefined threshold probability that the customer associated with the billing record will call the call-center;
   collecting a third dataset including:
      customer identification,
      a billing item discussed with a customer, and
      a resolution accepted by the customer to resolve a problem associated with the billing item;
   training a second AI-model, using the third dataset, to recognize at least one triplet of a second customer type, a second billing item type, and a resolution type, and an associated second probability that a resolution of the resolution type is accepted by the customer;

for each billing record of the at least one billing record in the second dataset having a probability higher than a predefined threshold probability that the customer associated with the billing record will call the call-center:
  using the second AI model to determine, for a billing item in the billing record, at least one resolution for billing item, and
  selecting a resolution from the at least one resolution determined for the billing item, and
  performing the selected resolution to preempt the call to the call-center,
  wherein the selected resolution is performed before a bill including the billing item is issued to the customer.

2. The method of claim 1, further comprising:
indicating to a user at least two of:
  the billing record having the probability higher than the predefined threshold,
  the customer associated with the billing record having the probability higher than the predefined threshold, and
  the billing item type having a highest probability to be discussed by the customer in the call to the call-center.

3. The method of claim 1, further comprising:
  iterating the steps of using the first AI model and using the second AI model until each billing item type of the first dataset has a corresponding billing item type of the third dataset.

4. The method of claim 1, wherein selecting the resolution is made by calculating a selection criterion that includes at least one of:
  a probability that the customer may concede,
  a concession expectancy including the concede probability multiplied by inverse of an estimation cost of the resolution, or
  a ratio between an estimation of the cost of handing the customer call and the estimation of cost of the resolution.

5. The method of claim 1, wherein each record of the first dataset additionally includes at least one of:
  date of the past call to the call-center,
  time of the past call to the call-center,
  a billing item not discussed during the past call to the call-center, or
  an estimation of a cost of the past call to the call-center.

6. The method of claim 5, wherein each record of the second dataset additionally includes at least one of:
  date of discussion with the customer,
  time of discussion with the customer,
  billing data not discussed with the customer,
  compensation refused by the customer, or
  an estimation of the cost of the compensation accepted by the customer.

7. The method of claim 1, wherein performing the selected resolution includes amending the bill including the billing item.

8. A non-transitory computer readable medium storing computer code executable by a processor to perform a method comprising:

collecting a first dataset including a plurality of records, wherein the first dataset includes:
  a plurality of customer records,
  a plurality of billing records for each of the customers, wherein each billing record includes at least one billing item, and
  a plurality of call incident records, wherein each call incident record includes:
    an identification of the calling customer,
    an identification of a billing record, and
    an identification of a billing item discussed with the calling customer during a past call with a call-center;
training a first artificial intelligence model (AI-model), using the first dataset, to recognize at least one pair of a first customer type and a first billing item type, and an associated first probability that such pair results in a call to the call-center;
collecting a second dataset comprising new billing records;
using the first AI-model to detect at least one billing record in the second dataset having a probability higher than a predefined threshold probability that the customer associated with the billing record will call the call-center;
collecting a third dataset including:
  customer identification,
  a billing item discussed with a customer, and
  a resolution accepted by the customer to resolve a problem associated with
the billing item;
training a second AI-model, using the third dataset, to recognize at least one triplet of a second customer type, a second billing item type, and a resolution type, and an associated second probability that a resolution of the resolution type is accepted by the customer;
for each billing record of the at least one billing record in the second dataset having a probability higher than a predefined threshold probability that the customer associated with the billing record will call the call-center:
  using the second AI model to determine, for a billing item in the billing record, at least one resolution for billing item, and
  selecting a resolution from the at least one resolution determined for the billing item, and
  performing the selected resolution to preempt the call to the call-center,
  wherein the selected resolution is performed before a bill including the billing item is issued to the customer.

9. The non-transitory computer readable medium of claim 8, the method further comprising:
indicating to a user at least two of:
  the billing record having the probability higher than the predefined threshold,
  the customer associated with the billing record having the probability higher than the predefined threshold, and
  the billing item type having a highest probability to be discussed by the customer in the call to the call-center.

10. The non-transitory computer readable medium of claim 8, the method further comprising:
  iterating the steps of using the first AI model and using the second AI model until each billing item type of the first dataset has a corresponding billing item type of the third dataset.

11. The non-transitory computer readable medium of claim 8, wherein selecting the resolution is made by calculating a selection criterion that includes at least one of:
- a probability that the customer may concede,
- a concession expectancy including the concede probability multiplied by an inverse of an estimation cost of the resolution, or
- a ratio between an estimation of the cost of handing the customer call and the estimation of cost of the resolution.

12. The non-transitory computer readable medium of claim 8, wherein each record of the first dataset additionally includes at least one of:
- date of the past call to the call-center,
- time of the past call to the call-center,
- a billing item not discussed during the past call to the call-center, and
- an estimation of a cost of the past call to the call-center.

13. The non-transitory computer readable medium of claim 12, wherein each record of the second dataset additionally includes at least one of:
- date of discussion with the customer,
- time of discussion with the customer,
- billing data not discussed with the customer,
- compensation refused by the customer, and
- an estimation of the cost of the compensation accepted by the customer.

14. A system, comprising:
- a non-transitory memory storing instructions; and
- one or more processors in communication with the non-transitory memory that execute the instructions to perform a method comprising:
  - collecting a first dataset including a plurality of records, wherein the first dataset includes:
    - a plurality of customer records,
    - a plurality of billing records for each of the customers, wherein each billing record includes at least one billing item, and
    - a plurality of call incident records, wherein each call incident record includes:
      - an identification of the calling customer,
      - an identification of a billing record, and
      - an identification of a billing item discussed with the calling customer during a past call with a call-center;
  - training a first artificial intelligence model (AI-model), using the first dataset, to recognize at least one pair of a first customer type and a first billing item type, and an associated first probability that such pair results in a call to the call-center;
  - collecting a second dataset comprising new billing records;
  - using the first AI-model to detect at least one billing record in the second dataset having a probability higher than a predefined threshold probability that the customer associated with the billing record will call the call-center;
  - collecting a third dataset including:
    - customer identification,
    - a billing item discussed with a customer, and
    - a resolution accepted by the customer to resolve a problem associated with
  - the billing item;
  - training a second AI-model, using the third dataset, to recognize at least one triplet of a second customer type, a second billing item type, and a resolution type, and an associated second probability that a resolution of the resolution type is accepted by the customer;
  - for each billing record of the at least one billing record in the second dataset having a probability higher than a predefined threshold probability that the customer associated with the billing record will call the call-center:
    - using the second AI model to determine, for a billing item in the billing record, at least one resolution for billing item, and
    - selecting a resolution from the at least one resolution determined for the billing item, and
    - performing the selected resolution to preempt the call to the call-center,
    - wherein the selected resolution is performed before a bill including the billing item is issued to the customer.

15. The system of claim 14, the method further comprising:
- indicating to a user at least two of:
  - the billing record having the probability higher than the predefined threshold,
  - the customer associated with the billing record having the probability higher than the predefined threshold, and
  - the billing item type having a highest probability to be discussed by the customer in the call to the call-center.

16. The system of claim 14, the method further comprising:
- iterating the steps of using the first AI model and using the second AI model until each billing item type of the first dataset has a corresponding billing item type of the third dataset.

* * * * *